Figure 1:
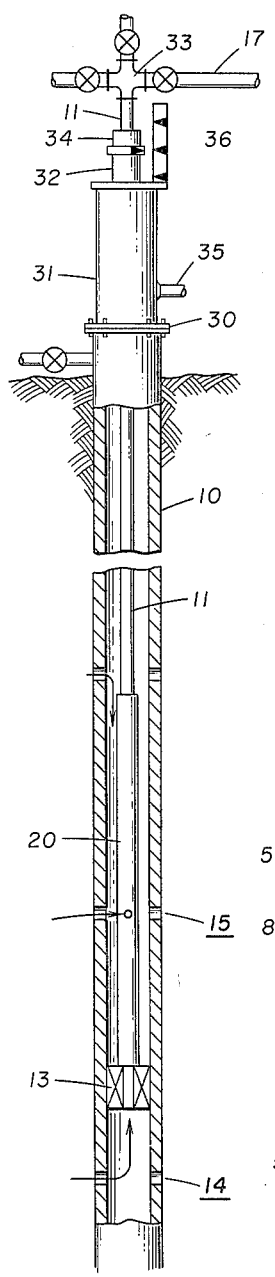

May 24, 1966  F. M. TYE, JR  3,252,518

SLICK JOINT VALVE FOR SEQUENTIAL FLOW CONTROL

Filed July 10, 1962  3 Sheets-Sheet 1

May 24, 1966  F. M. TYE, JR  3,252,518
SLICK JOINT VALVE FOR SEQUENTIAL FLOW CONTROL
Filed July 10, 1962  3 Sheets-Sheet 2
FIG. 5
FIG. 6
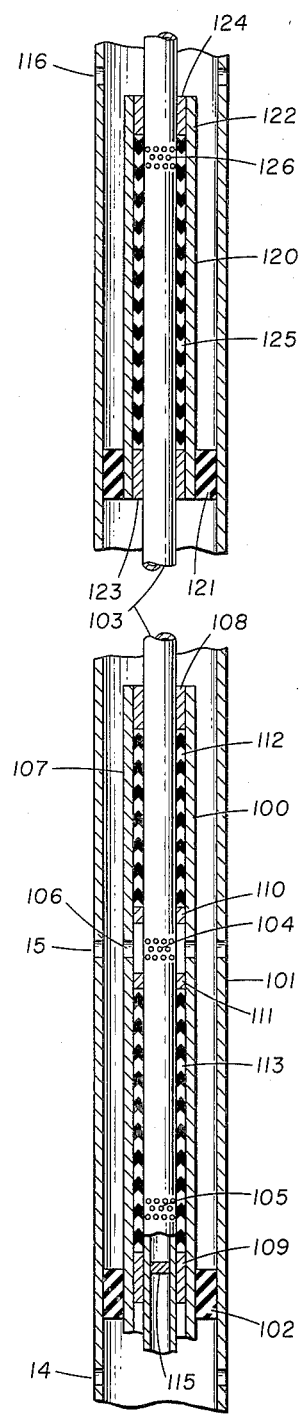
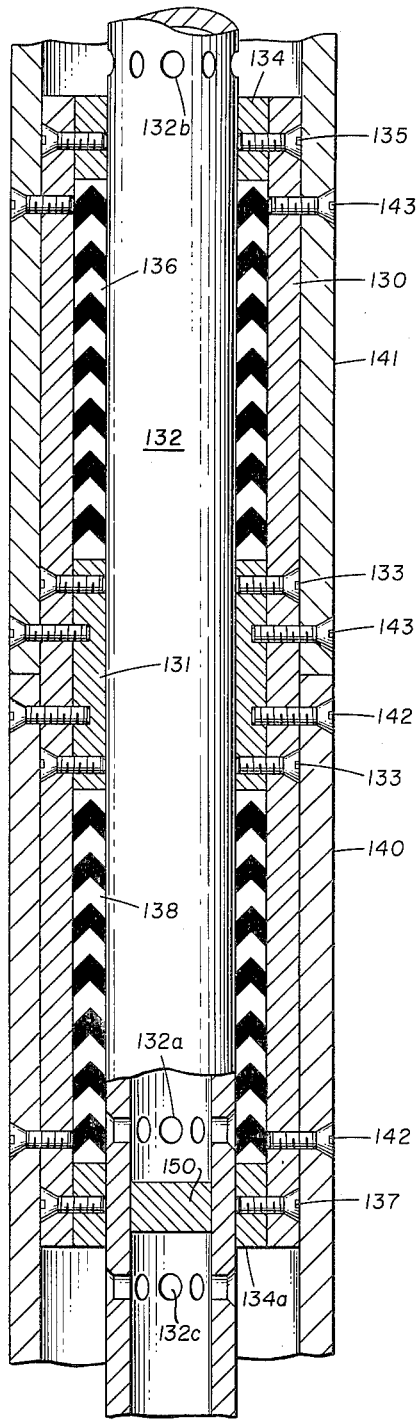

May 24, 1966   F. M. TYE, JR   3,252,518
SLICK JOINT VALVE FOR SEQUENTIAL FLOW CONTROL
Filed July 10, 1962   3 Sheets-Sheet 3

United States Patent Office 3,252,518
Patented May 24, 1966

3,252,518
SLICK JOINT VALVE FOR SEQUENTIAL
FLOW CONTROL
Frank M. Tye, Jr., Dallas, Tex., assignor to Harvest
Queen Mill & Elevator Company, Dallas, Tex., a corporation of Texas
Filed July 10, 1962, Ser. No. 208,874
5 Claims. (Cl. 166—185)

This invention relates to a valve system for controlling the fluid flow from a plurality of producing horizons and more particularly to a tubing-operated valve unit adaptable to be positioned with reference to an anchored housing at any one of a plurality of flow positions for flow from separate horizons.

In many producing oil wells, two or three zones of producing potential are encountered. Multiple strings of tubing are often installed in such wells and suitably connected so that flow in each string is limited to a particular horizon. Maintaining separate the production from different horizons necessitates expensive installations. In instances where the allowable production can be produced from a given zone in less than one-half of an allocated producing period, multiple installations often become economically unfeasible and a less complex installation can be employed for completing the desired production through time sharing of a single installation.

The allowable production from a given zone in general is fixed by governmental regulation. In many areas allowables are so apportioned that a monthly allowable can be produced in periods of the order of eight days. With such production rates and limits, it is possible to produce from one zone during one period of the month and from another zone during another period through the same producing string of tubing, thereby avoiding the more complicated installation widely employed on multiple completion wells.

More particularly, in accordance with the present invention, there is provided a dual completion packer joint for an oil well having upper and lower oil bearing formations which are to be produced sequentially without intermingling of the fluids produced therefrom. The packer joint includes an outer sleeve member having a cylindrical aperture therethrough and a rectangular member extending therebelow for connection to a packer means within the well. The outer sleeve is provided with a packing gland in the upper and lower ends thereof. A hollow polished cylinder is slidably mounted within the outer sleeve and is sealed therein at the packing glands. A bulkhead is provided intermediate the length of the polished cylinder with at least two spaced-apart ports above the bulkhead and at least one port below the bulkhead. The polished cylinder is provided at its lower end with a rectangular element rigidly secured thereto and adapted to slide through the lower rectangular element of the outer sleeve. Preferably, means are provided for limiting the relative longitudinal movement of the polished cylinder in the outer sleeve at all times to maintain a sealed relation between the sleeve and both the upper and lower packing glands while permitting transmission of rotational forces from the polished cylinder to the outer sleeve by way of the rectangular elements.

Figures 2, 3:
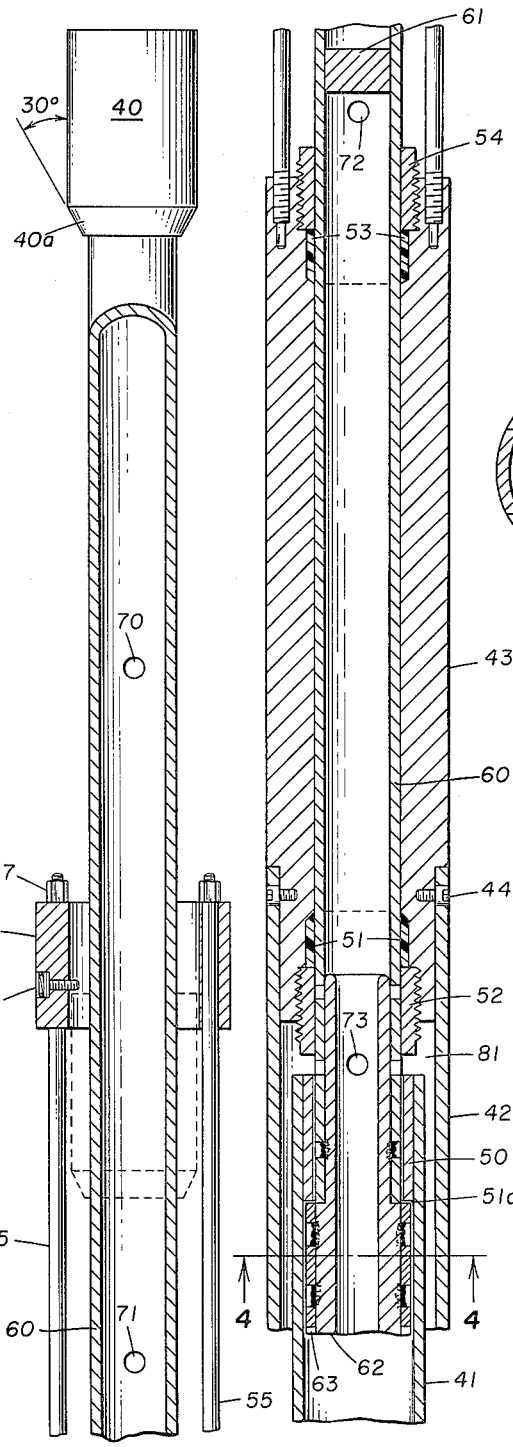
Figure 4:
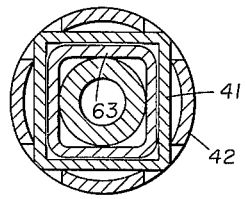
Figure 7:
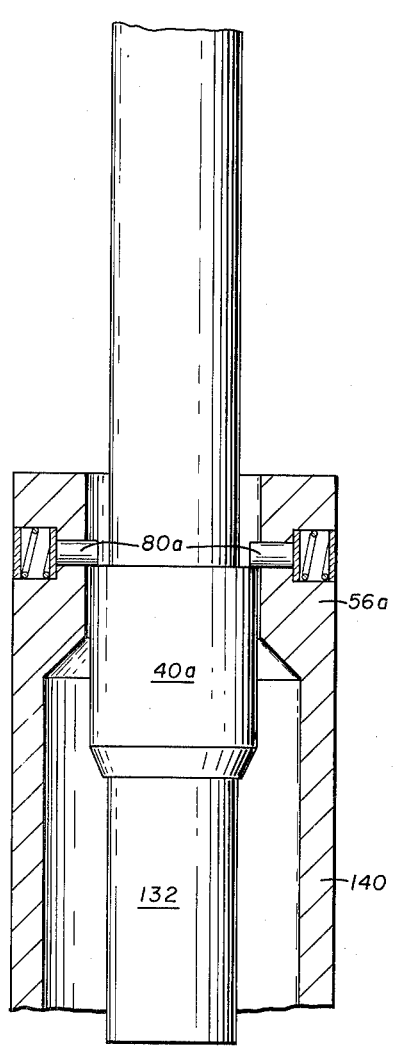
Figure 8:
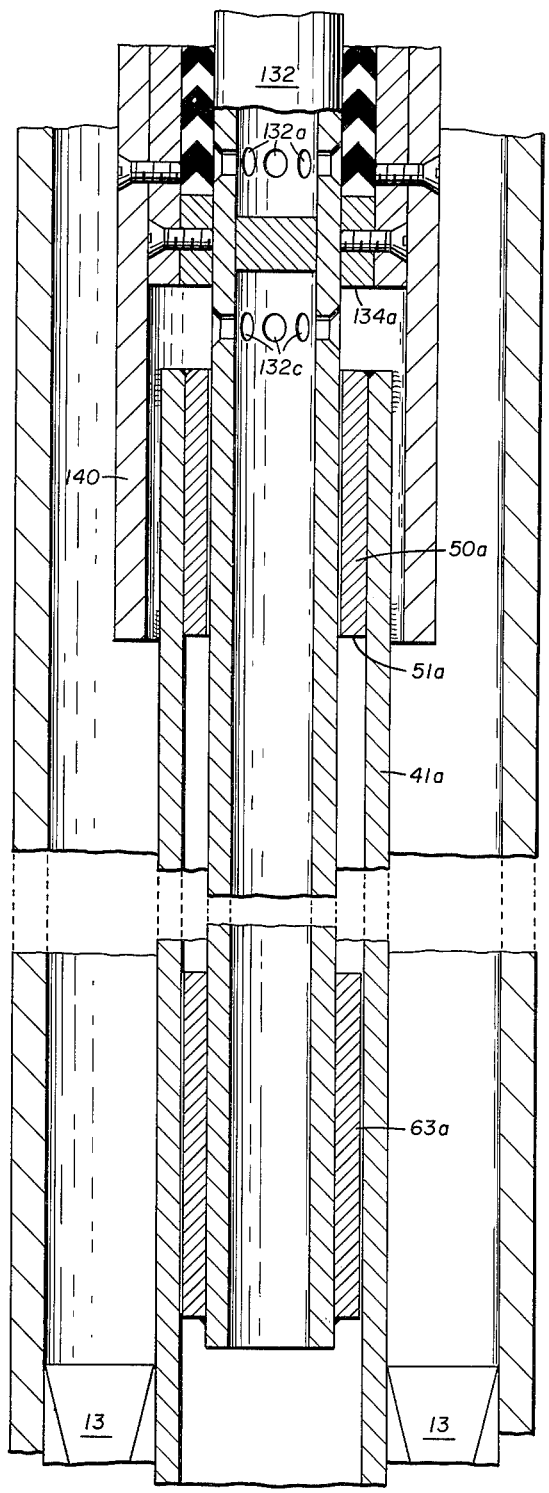

For a more complete understanding of the present invention and for further objects and advantages thereof, reference may now be had to the following description taken in conjunction with the accompanying drawings in which:

FIGURE 1 illustrates a well installation;
FIGURES 2 and 3 are detailed sectional views of the downhole valve system of FIGURE 1;
FIGURE 4 is a sectional view taken along the line 4—4 of FIGURE 3;

FIGURE 5 shows a multizone installation; and
FIGURES 6–8 illustrate a preferred embodiment of the invention.

Referring now to FIGURE 1, there is illustrated a well installation in which a casing 10 is set in a borehole through which there also extends a production string of tubing 11. A packer 13, such as a conventional packer, is set in the casing between perforations 14 and 15 leading respectively from a lower producing zone and an upper producing zone. Fluids may thus enter the casing 10 from either of the perforations 14 and 15.

In accordance with the present invention, a provision is made for channeling the production from the perforations 14 and 15 through the tubing 11 sequentially to the earth's surface for flow by way of a line 17 to suitable storage or handling facilities. A valve unit 20 is mounted in the tubing string and is coupled at its lower end to the packer 13. The valve 20, as hereinafter explained will select flow from any one of the two producing zones.

At the earth's surface the casing 10 supports a jack cylinder 31 on its upper flange 30. A jack piston 32 is provided through which the tubing 11 extends. The tubing 11 is terminated at its upper end in a suitable control valve unit 33. A collar 34 is secured to the tubing 33 and is seated on the upper end of piston 32. A line 35 is provided leading to the jack cylinder for actuation of the same by hydraulic pressure. By this means the tubing 11 may be raised or lowered over a distance sufficient to actuate the valve unit 20 for selective production from either perforation 14 or perforation 15. A suitable scale 36 is provided to provide a measure of the precise setting of the valve unit. Alternatively, the jack system and surface connection may be as shown in Patent No. 2,403,987.

In FIGURES 2 and 3, a valve system of the present invention has been illustrated partially in section to show details of construction thereof. More particularly, the lower end of the tube 11 of FIGURE 1 is to be secured in the collar 40. At the lower end of the collar 40 there extends a rectangular tube 41 which is adapted at its lower end to be secured into the packer 13 of FIGURE 1. Thus the tubing 41 serves to support the main valve body. The tubing 11 secured in collar 40 serves to move the valve piston within the valve body. As best seen in FIGURE 4, the rectangular tube 41 is welded into a cylindrical tube 42. The tube 42 is fastened to the lower end of the valve barrel 43 by means of fasteners such as bolts 44. An inner rectangular tube 50 is integrally secured to the inside of rectangular tube 41 at the upper end thereof. Thus there is presented a shoulder area 51a which serves as a piston stop.

The valve barrel 43 has an elongated cylindrical bore extending therethrough. At the lower end of the bore there is provided a lower packing gland 51. A packing nut 52 is threaded into the large bore at the end of valve barrel 43 to control the packing in the packing gland 51. In a similar manner, a packing gland 53 is provided in the upper end of the valve barrel 43 with a packing nut 54 threaded thereinto. A plurality of rods, such as the rod 55, are threaded at the lower ends thereof into the upper end of the valve barrel 43. The rod 55 extends upwardly and is secured in a relatively short cylinder 56. The cylinder 56 is secured on the rod 55 by means of nut 57.

Thus far described is the stationary portion of the valve system to be secured to the packer 13 of FIGURE 1.

The moving portion of the system includes the collar 40 at the upper end thereof. The collar is provided with a sloping face 40a below which the hollow valve piston 60 extends. The piston 60 is a relatively short section of cylindrical tubing having a highly polished exterior wall. Approximately midway the length of the piston 60 there is provided a baffle or stop 61 which is fixed in position and provides a fluid-tight bulkhead in the piston 60. At the lower end of the piston 60 there is provided an insert 62 which is welded into the lower end of the piston and is thus in fixed position and is open ended. The lower end of the insert 62 is welded to a relatively short length of rectangular tubing 63. As illustrated in FIGURE 4, tube 63 moves freely in the lower rectangular tube 41. The upper end of the rectangular tubing 63 engages the shoulder area 51a of the rectangular tube 50 which is welded or secured in the upper end of the collar 40. The movement of the piston 60 is thus limited in its upward traverse by the tube 63 engaging the tube 50.

Four ports extend through the walls of the piston 60. The port 70 is provided for entry into the tubing of fluids from the upper producing perforation 15. The next lower port 71 is provided for entry into the tubing of fluid from the lower producing perforation 14. The lower port 72 is provided for unloading the tubing when the valve system is to be removed from the well bore.

As illustrated in FIGURES 2 and 3, the piston 60 is elevated in position for removal thereof from the bore hole. It will be noted that the port 72 is above the upper packing gland 53 so that fluid in the tubing and on the outside of the tubing above the packer 13 may flow into the port 72 downward and out through the lower end of the tubing 41.

When the valve system is to be set down into the packer 13 for initiating producing operations, the piston is lowered until the upper end of the collar 40 is at least below the level of a set of spring-biased shear pins such as the pins 80. The sloping face 40a of the collar will move the pins 80 outward, permitting the collar to pass thereby. However, in order to withdraw the collar to a point above the pins 80, the pins must be sheared.

The producing stroke of the piston 60 is limited to travel of the collar 40 from the upper position as limited by the pins 80 to a lower positon where the low margin of the sloping face 40a rests on the upper packing nut 54. In the upper position the port 70 is above the upper packing nut 54 so that fluids may enter into the piston 60 therethrough. In such upper position, however, the lower port 71 is positioned within the valve body 43 below the upper packing gland 53 and above the lower packing gland 51. In this position and with the stop 61, present, there can be no communication from the lower formation into the portion of the piston above the bulkhead.

When production is to be routed from the lower formation, the piston 60 is lowered until the collar 40 rests on the nut 54. In this position the upper port 70 is located within the valve body between the packing glands 53 and 51 so that no fluid can enter the piston 60 from the upper producing formation. At the same time the lower port 71 will be positioned below the lower packing nut 52. When this is the case, flow from below packer 13 up through the rectangular tube 41 will pass outward through the port 72 by-passing the stop 61 and then will flow into the piston 60 by way of port 71.

The lower port 73 is provided to permit movement of the piston 60 without the build-up of restraining forces or pressures within the intermediate zone 81.

The lower end of the piston is restrained from rotation relative to the barrel 43 of the valve by reason of the presence of the rectangular tubing elements 41 and 63. It will be noted that the piston 60 is rigidly secured as by welding to the insert 62 and the rectangular tube 63. Similarlly, the rectangular tube 41 is rigidly welded to the valve body member 42. By this means the necessary rotational forces can be transmitted through the valve for setting packers and the like while permitting use of valve elements of relatively simple construction. The only machined element required in this system is the polished exterior surface of the piston 60. The valve packing glands 51 and 53 as controlled by settings of the nuts 52 and 54 will maintain fluid-tight the boundaries between the slick joint piston 60 and the packings. It has been found that the above valve will permit production from two formations sequentially and can be constructed at substantially less cost than prior art devices and yet may incorporate all of the necessary and desirable functions of such prior art devices.

In FIGURE 5, there is illustrated a system in which the present invention is employed for producing selectively from three zones. A first unit 100 is secured within the casing 101 by means of a packer 102. The polished tube 103 of tubing is connected in the tubing string leading to the surface and extends through the lower unit 100. Two sets of perforations 104 and 105 are provided in the walls of the polished tube 103. The upper set of perforations 104 are positioned facing ports 106 leading through the wall of the outer sleeve 107 at a point intermediate the length thereof. The sleeve 107 is an elongated hollow cylinder having end rings 108 and 109 which have slightly larger internal diameter than the outside diameter of the tube 103. A pair of central rings 110 and 111 are positioned above and below the port 106. Packing body 112 is compressed between rings 108 and 110 to permit movement of the tube 103 in sealed relation to sleeve 107. Similarly, a packing body 113 is compressed between rings 109 and 111. Thus, a seal is maintained both above and below the upper perforations 104. In this position fluid may flow into the tubing 103 by way of the intermediate casing perforations 15.

When it is desired to produce from the lower casing perforation 14 the tubing is lowered so that the upper set of perforations 104 in the tubing 103 are sealed by the packing body 113. The lower tubing perforations 105 are then below the packing 113 for ingress of fluids therethrough. Bulkhead 115 is secured in the lower end of the tubing 103 below perforations 105.

Positioned above the lower unit 100 is a second unit 120. Unit 120 is secured in casing 101 by a packer 121. Unit 120 includes an outer cylinder 122 having a lower packing ring 123 and an upper packing ring 124. Between rings 123 and 124 is a packing body 125 which is compressed into contact with the tubing 103. The portion of the tubing 103 extending through unit 120 has wall surfaces which are smooth to permit movement of the tubing relative to the unit 120. A set of perforations 126 is provided through the tubing wall, so that when the tubing 103 is elevated to place perforations 126 above ring 124 fluids may enter tubing 103 from the upper casing perforations 116. When in this position the upper perforations 104 in the lower unit 100 are sealed by the packing body 112. The lower perforations 105 are sealed by the packing body 113.

In this system the upper unit 120 may be inserted in a tubing string at any desired location above unit 100. Thus, formations widely separated can be produced sequentially through use of the combination elements shown in FIGURE 5.

In this case, the lower ends of the lower units 100 and 120 are provided with the rectangular sections as illustrated in FIGURE 3 for coupling into the packer 102. That is to say, the lower end of tube 41, FIGURE 3, will be cylindrical with suitable transposition from square cross section. The cylindrical section with threaded provisions is for coupling to the packer unit and for transmitting to a packer rotational forces by reason of the mating square sections.

In FIGURE 6, there is illustrated an embodiment of the valve system of the present invention which may readily be fabricated from stock materials with only the single central element, the polished tube, requiring fine machining. In this embodiment an intermediate cylinder 130 is provided to support at a midpoint a short internal cylinder 131. Cylinder 131 is of a diameter in excess of the diameter of the tubing 132 so that the tubing may move freely therethrough. The cylinder 131 is secured to the cylinder 130 as by screws or bolts 133.

An upper ring 134 is secured in the upper end of the cylinder 130 by bolts 135. Packing 136 is compressed between rings 131 and 134 to engage the walls of the cylinder 132. Similarly, a lower ring 134a is secured in the lower end of the cylinder 130 by bolts 137. Packing 138 is compressed between rings 134a and 131 for effect a seal to the tubing 132. A pair of outer cylinders 140 and 141 are telescopically fitted over the intermediate cylinder 130 abutting each other at the midpoint of cylinder 130. A lower outer cylinder 140 is secured to intermediate cylinder 130 by bolts 142. Similarly, the upper outer cylinder 141 is secured to cylinder 130 by bolts 143. The lower outer cylinder 140 extends downwardly to square section 63a, FIGURE 8, using the construction illustrated in FIGURE 3, wherein square section 41a is secured in packer 13 at its lower end and supports a square stop section 50a at its upper end. Stop section 50a has a down-facing shoulder 51a to limit upward movement of piston 132. The upper outer cylinder 141 extends upwardly in FIGURE 7 and includes the collar structure 56a corresponding with collar 56 of FIGURE 2. Cylinder 141 serves to replace the rods 55 of FIGURE 2.

Collar 56a serves to limit the upward traverse of the production stroke as above described in connection with FIGURES 2 and 3. When collar 40a is lowered onto ring 143, production from below packer 13 will be permitted and production from above packer 13 will be inhibited. Shear bolts 80a serve as an upper limit or stop to aid in control of valve adjustment. The upper outer cylinder 141 may, however, be terminated at the upper end of the intermediate cylinder 130, in which case, the stop arrangement provided by the collar 40a and the shear bolts 80a is eliminated. When the shear bolts are used and the valve is to be removed from the well, bolts 80a are sheared off by force applied to collar 40a. The length of the cylinder 132 between aperture 132c and the top of square section 63a is greater than the distance between the shoulder 51a and the top of ring 134. Thus, on upward movement of cylinder 132, the lower aperture 132c will appear above the upper packing means 136 and ring 134 before the member 63a engages the shoulder 51a.

It will be recognized that the embodiment of FIGURE 6 utilizes stock pipe sections. The inner cylinder 132 may be 1½" diameter polished stock with the apertures 132a and 132b arranged therein preferably beveled from the outer surface in order to avoid undue wear on the packing. The rings 131, 134, and 134a may then be of 2½" stock. The intermediate cylinder 130 may be of 3" stock. The outer cylinders 140 and 141 may be of 3½" stock. Thus, the only machined part necessary is the slick joint or cylinder 132. The bulkhead 150 may simply be a plug secured in the tubing 132 by bolts, welding, or other suitable means.

Having described the invention in connection with certain specific embodiments thereof, it is to be understood that further modifications may now suggest themselves to those skilled in the art and it is intended to cover such modifications as fall within the scope of the appended claims.

What is claimed is:

1. A multiple completion tool for an oil well which penetrates both an upper producing formation and a lower producing formation, which comprises:
   (a) an intermediate cylindrical sleeve,
   (b) a hollow polished cylinder for providing a flow passage from three orifices therein and adapted to be connected at its upper end to a tubing string extending into said well with said polished cylinder slidably extending through said sleeve and of outer diameter substantially less than the inside diameter of said intermediate sleeve,
   (c) a center ring means secured within said intermediate sleeve at a midpoint thereof and of inner diameter as to provide an opening therethrough for said polished cylinder,
   (d) cylindrical packing means positioned in said intermediate sleeve both above and below said center ring and encircling said polished cylinder for substantially the length of said intermediate sleeve,
   (e) compression rings at each end of said intermediate sleeve secured to said intermediate sleeve to maintain said packing means under compression for contact with said polished cylinder, the upper two of said three orifices being spaced apart a distance of the order of the length of said packing means,
   (f) a bulkhead within said polished cylinder between the lower two of said three orifices,
   (g) stop means including a breakable upper stop engaging said intermediate sleeve and said polished cylinder for limiting the travel of said polished cylinder to a traverse where at one extremity the center orifice is positioned below said packing means and at the other extremity the upper orifice is above said packing means, and
   (h) stop means coupled to said intermediate sleeve and extending therebelow to engage a lower portion of said polished cylinder for limiting upward movement of said polished cylinder to a position where the lower orifice is above said packing means.

2. A multiple completion tool for an oil well which penetrates both an upper producing formation and a lower producing formation, which comprises:
   (a) an intermediate cylindrical sleeve,
   (b) a hollow polished cylinder for providing a flow passage from three orifices therein and adapted to be connected at its upper end to a tubing string extending into said well with said polished cylinder slidably extending through said sleeve and of outer diameter substantially less than the inside diameter of said intermediate sleeve,
   (c) a center ring means secured within said intermediate sleeve at a midpoint thereof and of inner diameter as to provide an opening therethrough for said polished cylinder,
   (d) cylindrical packing means positioned in said intermediate sleeve both above and below said center ring and encircling said polished cylinder for substantially the length of said intermediate sleeve,
   (e) compression rings at each end of said intermedi- sleeve secured to said intermediate sleeve to maintain said packing means under compression for contact with said polished cylinder, the upper two of said three orifices being spaced apart a distance of the order of the length of said packing means,
   (f) a bulkhead within said polished cylinder between the lower two of said three orifices,
   (g) stop means including a releasable upper stop engaging said intermediate sleeve and said polished cylinder for limiting the travel of said polished cylinder to a traverse where at one extremity the center orifice is positioned below said packing means and at the other extremity the upper orifice is above said packing means, and
   (h) stop means having rotational rigidity coupled to said intermediate sleeve and extending therebelow to engage a lower portion of said polished cylinder for limiting upward movement of said polished cylinder to a position where the lower orifice is above said packing means.

3. A multiple completion tool for an oil well which penetrates both an upper producing formation and a lower producing formation, which comprises:
   (a) an intermediate cylindrical sleeve,
   (b) a polished hollow cylinder for providing a flow passage from three orifices therein and connected at its upper and to a coupling of a tubing string extending into said well with said polished cylinder slidably extending through said sleeve and of outer diameter substantially less than the inside diameter of said intermediate sleeve, (c) a hollow ring means secured within said intermediate sleeve at a midpoint through which said polished cylinder extends, (d) cylindrical packing means positioned in said intermediate sleeve both above and below said ring means and encircling said polished cylinder for substantially the length of said intermediate sleeve, (e) compression rings secured in each end of said intermediate sleeve to maintain said packing means under compression for contact with said polished cylinder, the upper two of said three orifices being spaced apart a distance of the order of the length of said packing means, (f) a bulkhead within said polished cylinder between the lower two of said three orifices, and (g) an outer sleeve encompassing said intermediate sleeve and including stop means for engaging said coupling to limit the upward travel of said polished cylinder at a position where the upper orifice is positioned above said packing means with said coupling engaging said intermediate sleeve to limit downward movement of said polished cylinder to a position where the center orifice is below said packing means.

4. A multiple completion tool for an oil well which penetrates both an upper producing formation and a lower producing formation, which comprises:

(a) an intermediate cylindrical sleeve, (b) a hollow polished cylinder for providing a flow passage from three orifices therein and adapted to be connected at its upper end to a tubing string extending into said well with said polished cylinder slidably extending through said sleeve and of outer diameter substantially less than the inside diameter of said intermediate sleeve, (c) a center ring means secured within said intermediate sleeve at a midpoint thereof and of inner diameter as to provide an opening therethrough for said polished cylinder, (d) cylindrical packing means positioned in said intermediate sleeve both above and below said center ring and encircling said polished cylinder for substantially the length of said intermediate sleeve, (e) compression rings at each end of said intermediate sleeve secured to said intermediate sleeve to maintain said packing means under compression for contact with said polished cylinder, the upper two of said three orifices being spaced apart a distance of the order of the length of said packing means, and (f) a bulkhead within said polished cylinder between the lower two of said three orifices.

5. A multiple completion tool for an oil well which penetrates both an upper producing formation and a lower producing formation, which comprises:

(a) an intermediate cylindrical sleeve, (b) a hollow polished cylinder for providing a flow passage from three orifices therein and adapted to be connected at its upper end to a tubing string extending into said well with said polished cylinder slidably extending through said sleeve and of outer diameter substantially less than the inside diameter of said intermediate sleeve, (c) a center ring means secured within said intermediate sleeve at a midpoint thereof and of inner diameter as to provide an opening therethrough for said polished cylinder, (d) cylindrical packing means positioned in said intermediate sleeve both above and below said center ring and encircling said polished cylinder for substantially the length of said intermediate sleeve, (e) compression rings at each end of said intermediate sleeve secured to said intermediate sleeve to maintain said packing means under compression for contact with said polished cylinder, the upper two of said three orifices being spaced apart a distance of the order of the length of said packing means, (f) a bulkhead within said poilshed cylinder between the lower two of said three orifices, and (g) stop means coupled to said intermediate sleeve and extending therebelow to engage a lower portion of said polished cylinder for limiting upward movement of said polished cylinder to a position where the lower orifice is above said packing means.

References Cited by the Examiner

UNITED STATES PATENTS

| | | | |
|---|---|---|---|
| 2,720,926 | 10/1955 | Brown | 166—226 |
| 2,951,536 | 9/1960 | Garrett | 166—224 X |
| 2,951,539 | 9/1960 | Malove et al. | 166—224 X |
| 3,024,846 | 3/1962 | Gage | 166—226 |
| 3,040,812 | 6/1962 | Howard | 166—224 X |

CHARLES E. O'CONNELL, *Primary Examiner.*